United States Patent [19]

Helgesen

[11] 4,326,158
[45] Apr. 20, 1982

[54] METHOD FOR ATTENUATING OSCILLATIONS OF A ROTATING SYSTEM

[75] Inventor: Herman Helgesen, Lund, Sweden

[73] Assignee: SAB Industri AB, Landskrona, Sweden

[21] Appl. No.: 209,104

[22] PCT Filed: Feb. 13, 1980

[86] PCT No.: PCT/SE80/00043
§ 371 Date: Jul. 15, 1980
§ 102(e) Date: Jul. 15, 1980

[30] Foreign Application Priority Data

Feb. 14, 1979 [SE] Sweden ............................... 7901293

[51] Int. Cl.³ ...................... G05D 13/06; H02P 9/02; F16F 15/18
[52] U.S. Cl. ........................................ 322/4; 74/572; 310/74; 322/29; 322/40
[58] Field of Search ............................ 322/4, 38–43, 322/29, 32; 310/74, 93, 105, 153; 74/572

[56] References Cited

U.S. PATENT DOCUMENTS 2,767,367 10/1956 Black .................................... 322/32
3,450,911 6/1969 Smith ............................. 310/105 X
4,128,020 12/1978 Gray .............................. 310/153 X

FOREIGN PATENT DOCUMENTS 864626 4/1961 United Kingdom ................. 310/74

*Primary Examiner*—Robert J. Hickey
*Attorney, Agent, or Firm*—Laurence R. Brown

[57] ABSTRACT

A method for attenuating oscillations of a rotating system.

Acceleration and deceleration of the system are sensed. In dependence on an acceleration, an eddy-current brake is applied to the rotating system. In dependence on a deceleration, rotational energy is supplied to the system from a rotational energy source.

6 Claims, 9 Drawing Figures

METHOD FOR ATTENUATING OSCILLATIONS OF A ROTATING SYSTEM

TECHNICAL FIELD

This invention relates to a method for attenuating oscillations of a rotating system comprising a driving rotary element and a driven rotary element operatively connected to the driving element to be rotated thereby, such oscillations being induced by the input torque of the system deviating from the value corresponding to the torque required by the driven rotary element at a selected rotational speed.

BACKGROUND ART

In such system the driving element can be a water or wind driven turbine, an internal combustion engine or other drive engine, and the driven element can be an electric generator (dynamo) or other apparatus which should be kept accurately at a predetermined rotational speed without substantial oscillations.

Although the invention can be applied generally to any system of the kind referred to it is particularly well suited for application to wind power stations. In such power stations the generator preferably is a synchronous generator which should be driven at the synchronous rotational speed in order to generate electric power at the predetermined frequency, usually 50 or 60 cps. As far as a synchronous generator is concerned the rotational speed thereof is maintained at the value corresponding to the frequency of the network to which the generator is connected, but due to rapid and abrupt changes in the wind velocity and direction and in the generator load it cannot be avoided that oscillations occur in the rotary system, due to the fact that the input torque supplied by the turbine deviates from the value corresponding to the torque required by the generator at the actual speed and load. Such oscillations create transient currents in the generator circuit with accompanying energy losses.

DISCLOSURE OF INVENTION

In order to eliminate or at least considerably reduce oscillations in rotary systems of the kind referred to and particularly in a rotary system comprising a wind turbine and a synchronous generator driven by the turbine, the method of the invention has obtained the characteristics of claim 1.

BRIEF DESCRIPTION OF DRAWINGS

In order to illustrate the invention an embodiment thereof will be described below, reference being made to the accompanying drawings in which.

BEST MODE OF CARRYING OUT THE INVENTION

Figure 1:
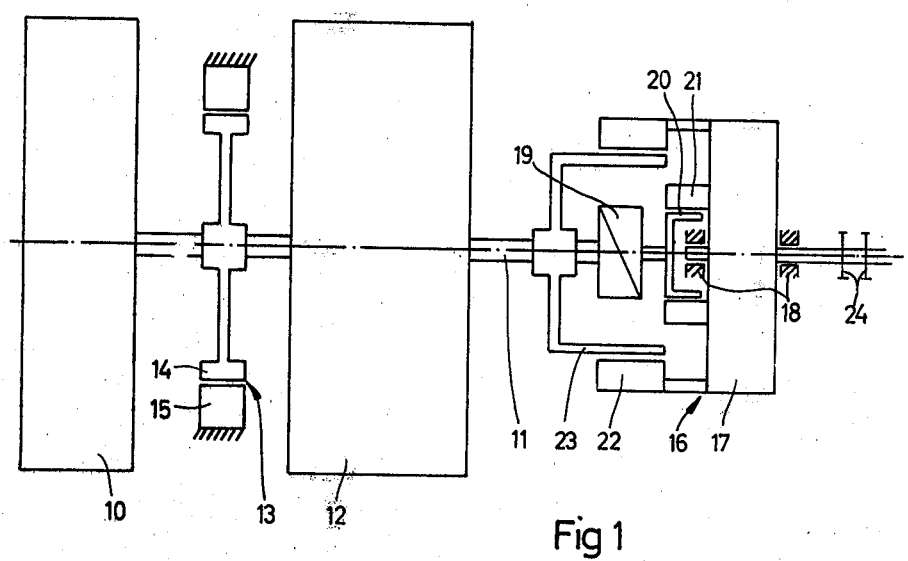
FIG. 1 is a diagrammatic view of a rotary system primarily comprising a turbine and a generator driven thereby.

Referring to FIG. 1, a turbine 10, e.g. a wind turbine such as a turbine of the air screw type, is connected to a shaft 11 which is rotatably mounted in a conventional manner not shown. A generator 12 such as a synchronous generator is also connected to this shaft. In order to maintain a predetermined rotational speed of the shaft 11 a conventional speed regulator, not shown, may be provided which senses the rotational speed and controls the turbine in dependence on the speed e.g. by adjusting the angle of the blades or vanes thereof (long term control). The speed of the generator can also be governed by a network connected to the generator, to maintain the synchronous speed as is commonly applied.

In order to attenuate such oscillations as may occur in the rotary system due to rapid or abrupt changes in the wind velocity and direction or in the generator load (short term control) the rotary system comprises means for working the method according to the invention. These means comprise an eddy-current brake 13 including a rotating element 14 connected to the shaft 11, and a stationary element 15 surrounding the rotating element, which is mounted in a frame not shown.

Said means may also comprise an energy storing device 16 including a flywheel 17 which is rotatably journalled around its axis by means of bearings 18 so as to be rotatable in relation to the shaft 11 and independently of the rotation thereof. However, the flywheel 17 can be driven by the shaft over a gearing 19, the input element of which is connected to the shaft 11 and the output element of which is connected to one part 20 of an eddy-current coupling, the other part 21 of which is connected to the flywheel 17. Thus, when the eddy-current coupling 20, 21 is energized the flywheel 17 is operatively connected to the shaft 11 to be rotated thereof. The gearing steps up the rotational speed of the shaft; the gearing ratio may be e.g. 1:2 the flywheel 17 thus being driven at a rotational speed, which is twice that of the shaft 11. A second eddy-current coupling comprises one part 22, connected to the flywheel at the outer periphery thereof, and another part 23 connected to the shaft 11. When this coupling is energized a supplementary torque can be supplied to the shaft 11 by the momentum of the rotating flywheel. The eddy-current couplings 20, 21 and 22, 23 should be energized and de-energized alternatively so that the shaft 11 is connected with the flywheel over one coupling at a time only. A set of slip rings 24 is arranged on the flywheel axis for connecting the couplings to an electric voltage source, the energization and de-energization of the couplings as well as the brake being controlled by the system disclosed in FIG. 2.

It may be noted that the flywheel 17, instead of being driven over the gearing 19, may be driven by a separate motor of any kind.

The function of the eddy-current brake 13 may, especially for smaller torque oscillations, be taken over by the driving eddy-current coupling 20,21 acting in such a case as a brake. The eddy-current brake 13 may even in special cases be omitted altogether.

Figure 2:
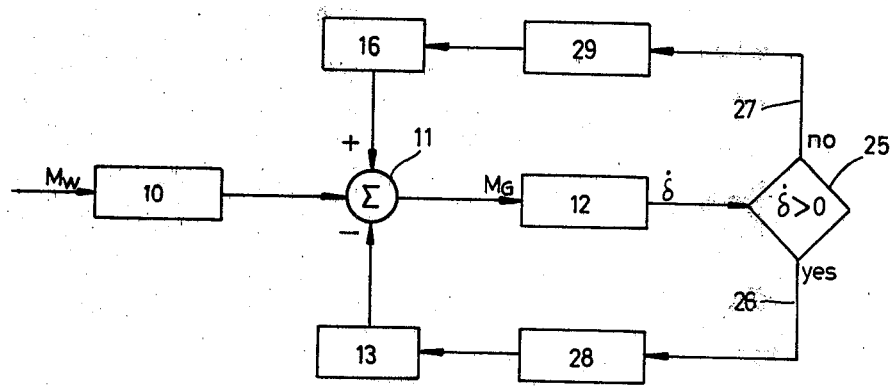
FIG. 2 is a block diagram of the attenuating system.

In FIG. 2 to which reference now is made the shaft is indicated by a circle 11. The turbine indicated by a block 10 to which a torque $M_W$ is supplied, said torque being induced by the wind as indicated by an arrow, supplies this torque less existing losses via the shaft 11 to the generator indicated by a block 12 the input torque of which is designated by an arrow $M_G$. The brake, block 13, and the energy storing device, block 16, are both operatively connected to the shaft 11 as indicated by arrows designated — and +, respectively, for absorbing momentum from and supplying additional momentum to the shaft, respectively, in order to decrease and increase, respectively, the torque $M_G$ supplied to the generator 12.

The derivative of the load angle $\delta$ of the generator, this derivative being designated $\dot{\delta}$, is sensed by known means, not shown, and represents an acceleration or a deceleration of the shaft 11. As indicated by an arrow $\dot{\delta}$, a signal representing the derivative of the load angle is supplied to a comparator 25 having two outputs 26 and 27, for supplying a "yes" or "no" signal according to the relation $\dot{\delta} > 0$ to output 26 or output 27, respctively. If the value of $\dot{\delta}$ is positive a signal is supplied to a proportional integrator 28 via output 26, and if the value is negtive a signal is supplied to a proportional integrator 29 via output 27. Each of these integrators is arranged to energize the brake 13 or the storage device 16, respectively, according to a predetermined relationship in dependence on the derivative of the load angle $\delta$ so as to compensate for an acceleration or deceleration of the shaft 11 causing oscillations of the shaft in either rotational direction thereof. Thus, a positive derivative of the load angle (acceleration) will induce energization of the brake 13 in order to retard the shaft 11, while a negative derivative of the load angle $\delta$ (deceleration) will induce de-energization of the coupling 20, 21 and energization of the coupling 22, 23 in order to accelerate the shaft 11 by means of the rotating flywheel 17 the rotational speed of which is higher than the rotational speed of the shaft.

Figure 3:
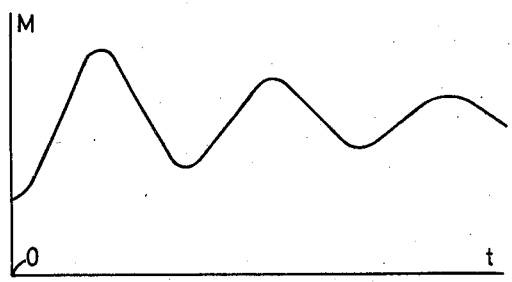
FIG. 3 is a diagram showing the generator electrodynamic torque response over the time on an input step torque and without any attenuation of the oscillations.
Figure 4:
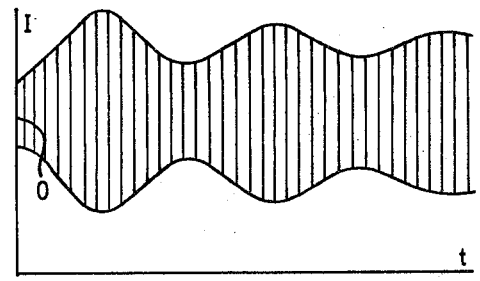
FIG. 4 is a diagram showing the instant value of the generator current over the time when the generator torque is oscillating according to FIG. 3 and thus no attenuation of the oscillations is applied.
Figure 5:
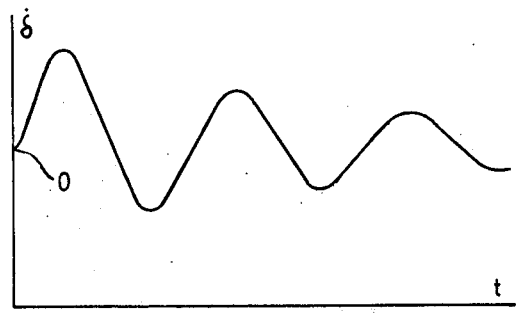
FIG. 5 is a diagram showing the derivative of the load angle of the generator over the time, corresponding to the conditions of FIGS. 3 and 4.

In FIG. 3 the generator torque response is shown over the time, the torque M being indicated on the vertical axis and the time being indicated on the horizontal axis. The diagram illustrates the conditions when no attenuation is applied to the rotating turbine generator system and it will be seen from the diagram that the generator torque due to an input step torque is oscillating to a considerable extent. These oscillations are reflected in the instant value of the generator current as shown in FIG. 4 wherein the vertical axis indicates the current and the horizontal axis indicates the time. Acceleration and deceleration of the shaft can be sensed by means measuring the derivative of the load angle, $\dot{\delta}$, which is illustrated in FIG. 5 wherein the vertical axis indicates degrees per second and the horizontal axis indicates the time.

Figure 6:
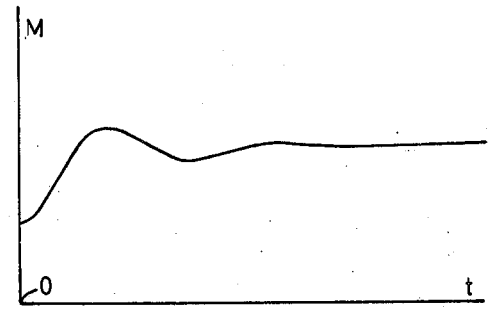
FIG. 6 is a diagram as that in FIG. 3 when oscillations are attenuated according to the method of the invention.
Figure 7:
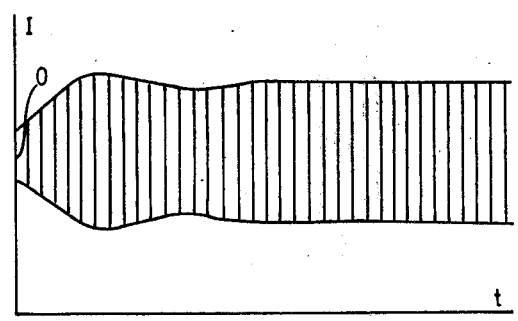
FIG. 7 is a diagram as that in FIG. 4 corresponding to the conditions of FIG. 6.
Figure 8:
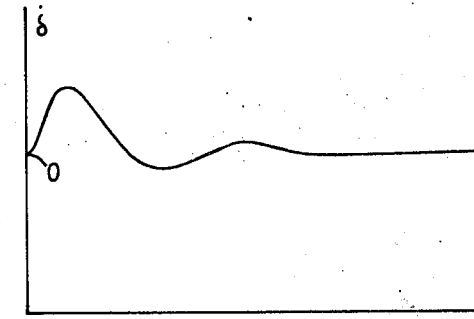
FIG. 8 is a diagram as that in FIG. 5 corresponding to the conditions of FIG. 6.
Figure 9:
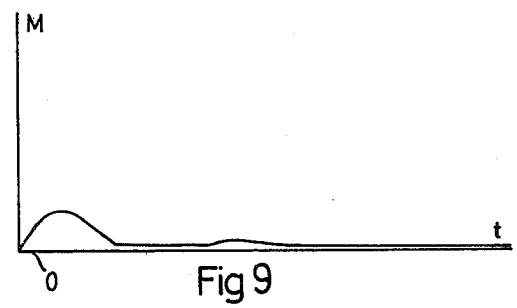
FIG. 9 is a diagram showing the attenuating torque over the time.

When the derivative of the load angle $\dot{\delta}$ is utilized for attenuating the oscillations by means of the system and the method described the input generator torque may be brought to a constant level after one oscillation as will be seen in FIG. 6 with a corresponding adjustment of the instant value of the generator current as seen in FIG. 7. It is obvious that the oscillations may be totally reduced by increasing the magnitude of the attenuating torque. FIG. 8 illustrates that the derivative of the load angle $\dot{\delta}$ of the generator is eliminated and the load angle thus is brought to a constant level. FIG. 9 illustrates the attenuating torque over the time, and it may be noted that in this case only the brake 13 has been active and not the energy storing device 16.

The load angle $\delta$ and its derivative $\dot{\delta}$ may be taken not only from the shaft speed and its variations but also as an alternative from the electrical power or current from the generator or the mechanical shaft torque measured on the generator or turbine shaft.

The system illustrated in FIG. 1 can include also means limiting the effect of the brake and the energy accumulating source and this system also can be further developed as is well known in the art within the scope of the present invention.

I claim:

1. A method for attenuating oscillations of a rotating element in a brakable system having a driving rotary element directly coupled to drive a driven rotary element at a selected rotational speed, wherein oscillations are induced by deviations of input torque tending to cause changes in the rotational speed, comprising the steps of,
   supplying a rotational energy storage means driven by said system which is selectively coupleable into said system to return rotational energy thereinto,
   sensing changes in rotational speed,
   energizing eddy current means as a function of changes in rotational speed,
   and selectively actuating by said eddy current means braking and energy storage return into the system to maintain said substantially constant speed by attenuating oscillations wherein the sensing of changes of rotational speed is accomplished by establishing the derivative of the load angle of a rotating member in the system.

2. The method defined in claim 1 including the steps of integrating the sensed derivative to produce an integrated signal, and controlling said eddy current means as a function of the integrated signal.

3. The method of claim 1 controlling attenuating with the aforesaid steps the oscillations of a rotating system comprising a wind actuated rotary driving element coupled to an electric generator driven element to produce a predetermined electrical frequency as a function of the generator rotary speed.

4. A method for attenuating oscillations of a rotating element in a brakable system having a driving rotary element directly coupled to drive a driven rotary element at a selected rotational speed, wherein oscillations are induced by deviations of input torque tending to cause changes in the rotational speed, comprising the steps of,
   supplying a rotational energy storage means driven by said system which is selectively coupleable into said system to return rotational energy thereinto,
   sensing changes in rotational speed,
   energizing eddy current means as a function of changes in rotational speed,
   and selectively actuating by said eddy current means braking and energy storage return into the system to maintain said substantially constant speed by attenuating oscillations wherein the sensing of changes in rotational speed comprise the steps of sensing both acceleration and deceleration of the rotary system, and the step of selectively actuating said eddy current means comprises the corresponding steps of dissipating rotational energy from the rotating element by braking the system in response to sensed acceleration and supplying rotational energy from said storage means into said system in response to sensed deceleration.

5. The method of claim 4 wherein the driving rotating element comprises a turbine and the driven rotary element comprises a generator, and the sensing of changes in rotational speed comprises sensing acceleration and deceleration by sensing the derivative of the load angle of the generator.

6. The method of claim 5, including the step of integrating and proportionately amplifying the sensed signal representative of the load angle of the generator, and thereafter actuating the braking and energy storage respectively in response to the integrated and amplified signal.

* * * * *

UNITED STATES PATENT OFFICE
CERTIFICATE OF CORRECTION

PATENT NO. : 4,326,158
DATED : April 20, 1982
INVENTOR(S) : Herman HELGESEN

It is certified that error appears in the above-identified patent and that said Letters Patent are hereby corrected as shown below:

On the title page:
Correct the Assignee of the above-identified patent to read as follows:

--SAB Industri AB, Landskrona, Sweden and Elprogress i AB, Lund, Sweden--.

Signed and Sealed this

Thirtieth Day of November 1982

[SEAL]

Attest:

GERALD J. MOSSINGHOFF

Attesting Officer

Commissioner of Patents and Trademarks